UNITED STATES PATENT OFFICE.

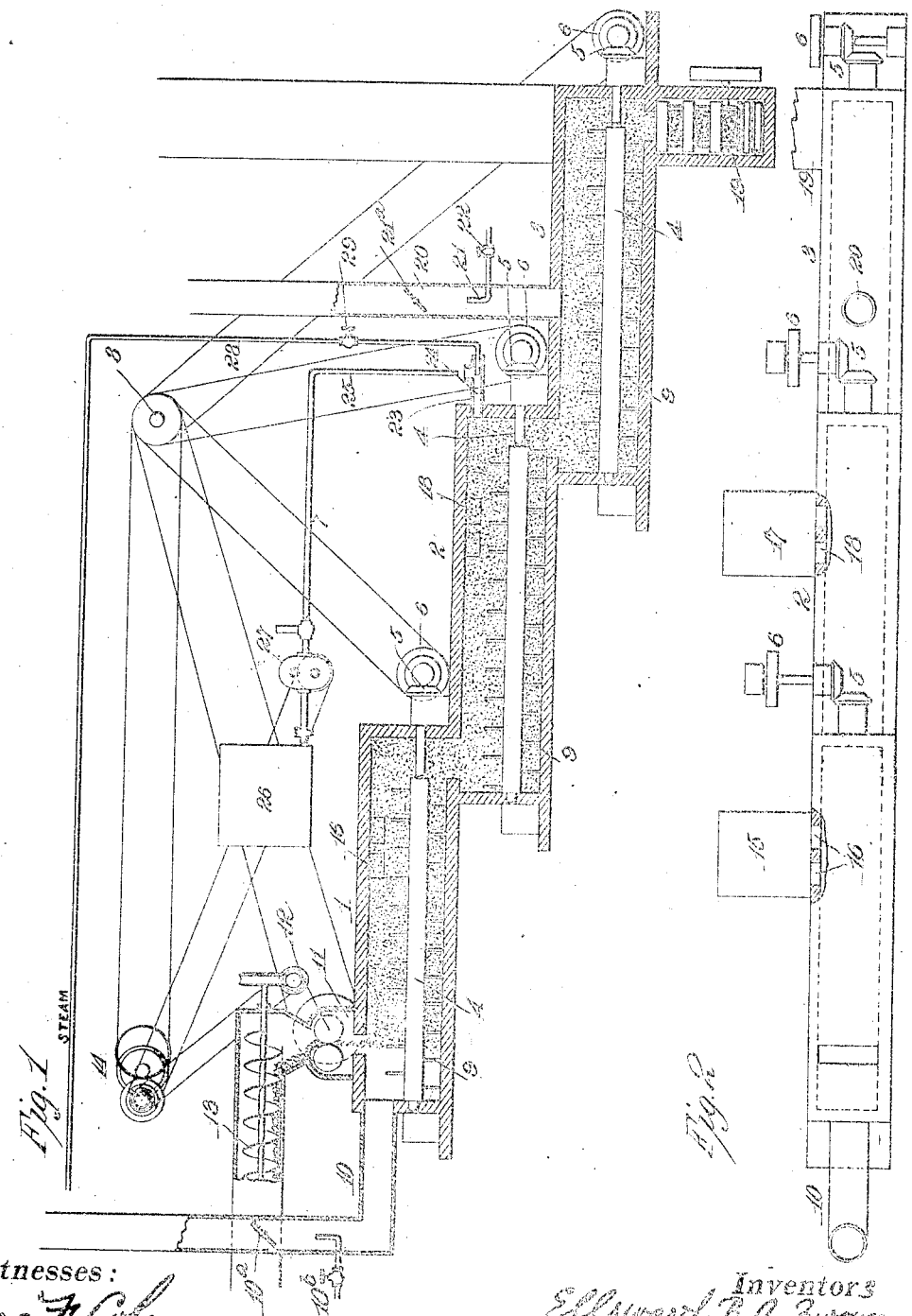

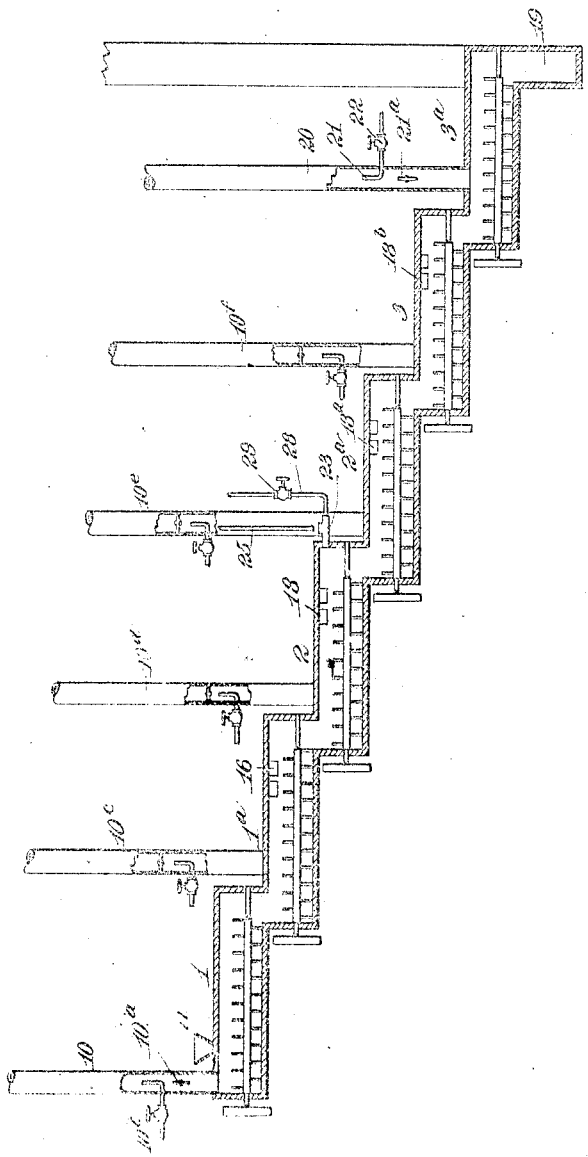

ELLSWORTH B. A. ZWOYER, OF HOBOKEN, AND ROLLAND A. ZWOYER, OF PERTH AMBOY, NEW JERSEY, ASSIGNORS TO THE ZWOYER FUEL COMPANY, OF NEW YORK, N. Y., A CORPORATION OF NEW JERSEY.

PROCESS OF PREPARING PULVERULENT MATERIALS FOR MOLDING OR BRIQUETING.

1,084,920.   Specification of Letters Patent.   Patented Jan. 20, 1914.

Application filed August 11, 1908. Serial No. 447,933.

*To all whom it may concern:*

Be it known that we, ELLSWORTH B. A. ZWOYER, residing at Hoboken, in the county of Hudson and State of New Jersey, and ROLLAND A. ZWOYER, residing at Perth Amboy, in the county of Middlesex and State of New Jersey, both citizens of the United States, have invented a certain new and useful Improvement in Processes of Preparing Pulverulent Materials for Molding or Briqueting, of which the following is a description.

The object we have in view is to produce a simple and effective process of preparing loose, crushed or pulverized material, such as fuel or mineral dust for molding or briqueting, and particularly for suitably drying or heating the material, for mixing the binder with the dried or hot product, and for then cooling and finishing the material to the condition where it can be most effectively handled.

The process can be most conveniently carried out in the apparatus which forms the subject-matter of a contemporaneous application for patent, which apparatus is shown diagrammatically and in a simplified form in the accompanying drawing, in which—

Figure 1 is a vertical section through the apparatus taken on the line of the flow of the material therethrough, Fig. 2 is a plan with certain portions omitted, and Fig. 3 is a vertical section through a modified form of the apparatus.

In all views like parts are designated by the same reference characters.

The apparatus consists of three or more horizontally arranged chambers 1, 2 and 3, located at successively lower elevations, so that the material can be discharged by gravity directly from one chamber into the next. Each section of the apparatus is in the form of a long horizontal chamber, preferably constructed of brick, or of metal, brick-lined, closed practically airtight and preferably having a rounded bottom. Longitudinally through each chamber extends a shaft 4, carrying gearing 5 at one end connected to means for applying power thereto.
The means chosen for illustration, comprises pulleys 6, which are driven by belts 7, from the countershaft 8. Upon the shafts in the chambers are secured blades 9, which rotate in the troughs in the bottoms of the chambers. Suitable and satisfactory blades are illustrated in our Patent No. 751,133.

The chamber 1 is provided at its receiving end with a stack 10 for carrying off the products of combustion, and with a feed spout 11 for delivering pulverulent materials to the chamber. The stack is provided with a controlling damper 10$^a$ and a steam jet 10$^b$ for producing an upward draft. The material is delivered into the spout by means of rolls 12, driven from the countershaft 8, and is fed to said rolls by a screw conveyer 13, driven by a variable speed device 14 from such countershaft. Any other means may be used for preparing and introducing the material. Near the discharging end of the chamber a heating furnace 15 is provided, delivering hot gases of combustion through flues 16 to the interior of the chamber at its top. The chamber 2 is also provided with a furnace 17 delivering hot products of combustion through flues 18 to the chamber at its top and near its discharging end. The chamber 3 discharges into an elevator pit 19, or other means for conveying the material to the molding or briqueting machines. Near the inner end of the chamber 3 is a stack or air pipe 20 provided with a steam jet 21 pointing toward its outlet. The stack 20 is also provided with a damper 21$^a$. This steam jet is controlled by a valve 22 so that a regulated outward draft can be produced in the stack 20 for drawing air through the chamber from the pit 19.

At the discharging end of the chamber 2 is located the discharge end of the pitch introducing apparatus 23, which discharges the pitch in a finely divided form upon the material in the chamber 2 at its discharging end, or in the receiving end of the chamber 3, depending upon the mode of operation of the pitch introducing apparatus, as will be described. This pitch introducing apparatus comprises a cylindrical pipe or chamber 24 in which the melted pitch is delivered through a pipe 25. The melted pitch contained in the tank 26 is delivered through the pipe 25 by means of a pump 27, driven by the variable speed device 14. The outlet of the pipe 25 best terminates a short distance above the inlet to the pipe 24 so that the passage of the pitch may be observed. Steam or water enters the pipe 24 through the pipe 28, which contains a valve 29 for controlling the passage of fluid through said pipe. The operation of the pitch introducing apparatus will be different according to the pressure and degree of wetness of the steam, or pressure of the water, if such alone is used, which enters the pipe 24. Water either alone or in wet steam will cause ebullition or bubbling of the pitch, producing pitch foam. Dry steam will not so affect the pitch but it will simply be blown in finely divided form into the mixing chamber 2. The details of operation of the pitch introducing apparatus will be described later. The pitch introducing apparatus is shown as delivering into the discharge end of the chamber 2, immediately above the opening to the chamber 3, and the pitch is delivered out of the open end of the pitch introducing apparatus into the chamber 2.

The shafts in the three chambers are preferably rotated at a sufficiently high speed to throw the finely divided material up against the top of the chambers from whence it is showered downwardly, thus maintaining the material in the chambers with its particles in a separated condition. In the chamber 1 the material will be effectively acted on by the hot gases of combustion which flow through this chamber to the stack 10. In the chamber 2 the shaft is preferably run at a sufficient speed, so that the material is showered or kept in a separated condition, the binder being mixed with the pulverulent material by being blown through the latter when it is maintained in a suspended position and also to some extent by the stirring action of the blades thereon. The chamber 3 is employed for cooling the material, so as to bring the binding pitch to the degree of plasticity where the material can be most effectively molded or briqueted, and in this chamber it is also desirable that the material should be tossed or separated more or less. In this third chamber there will be some mixing of the binder with the material, especially if the binder enters the mixing chamber 2 in the form of pitch foam.

In carrying out our process the furnaces 15 and 17 connected with the chambers 1 and 2 are first started in operation so as to heat up these portions of the apparatus. After these chambers are sufficiently heated the remainder of the apparatus is started in operation and the furnace 17 in connection with the chamber 2 may be shut down completely, or partially since the heated material discharged into the mixing chamber 2 will to a great extent maintain its own temperature in the latter chamber. The pulverulent material is fed to the drying chamber 1 in regulated quantities in a continuous stream and in that chamber it is maintained with its particles in a separated condition and is slowly fed forward to the discharging end of the chamber, while the hot gases of combustion travel through the chamber to the stack 10, drying and heating the separated particles of the material. The dried and heated material is delivered by gravity from the drying chamber 1 to the receiving end of the mixing chamber 2. In this chamber a regulated quantity of the binding material, i. e. coal tar pitch or asphaltum pitch is added to the material. The melted pitch is delivered continuously in regulated quantities to the inner end of the pitch introducing apparatus to which is also continuously supplied a jet of steam. The pitch is maintained in the tank 26 in a heated and highly fluid condition and is so delivered to the introducing apparatus and is blown from there into the chamber 2. In this second chamber the pitch is thoroughly mixed with the heated and dried pulverulent material by the beating and stirring action of the rotating blades and the material is at the same time slowly fed toward the discharging end of the chamber, where it is delivered into the receiving end of the cooling chamber 3. When the pitch introducing apparatus is operated with water, either alone or contained in wet steam, the water unites with the pitch and produces a large volume of foam of pitch which accumulates in the chamber 24 and runs out, or is blown out, by the pressure of the steam, and falls upon the material in the discharge end of the chamber 2, and in the receiving end of the chamber 3. The structure illustrated in Fig. 1, employs a pipe 28 of considerable length. This pipe is connected with a source of steam supply. There will be more or less condensation in this pipe and by controlling the valve 29 the steam will enter the pitch introducing apparatus, either dry, or in controllable degree of wetness. When very wet and under little pressure, the effect on the apparatus will be to merely foam the pitch. When under higher pressure the effect will be to both foam and blow the pitch. When the steam is entirely dry, which can be secured by opening the valve 29 to a greater extent, the pitch will not be foamed but will be atomized or blown in finely divided form into the chamber 2. In the latter chamber the material is fed forward to its discharging end and is cooled sufficiently to bring the pitch to the condition of plasticity where the material can be most effectively molded or briqueted. The required amount of air to produce the desired cooling effect is brought through this chamber by regulating the steam jet in the stack 20 and also by controlling the damper 21ᵃ.

While we have shown three sections of apparatus in the drawing, one for drying the material, one for mixing the binder with the material, and one for cooling the mixed product, it is evident that two or more sections of apparatus may be used for each purpose. Fig. 3 illustrates such an arrangement. The chambers are arranged in the manner already described, at different elevations, and successively discharging one into the next. The material enters the chamber 1, through the chute or hopper 11, and passes from it to the chamber 1ª, the hot gases traversing the chambers 1ª and 1 from the flues 16 to the stack 10. The pitch introducing apparatus 23 connects with the discharging end of chamber 2. This chamber is provided with heating flues 18 and discharges into the chamber 2ª, also shown as provided with heating flues 18ª. When the pitch introducing apparatus is used with steam pressure the finely divided pitch will be thrown longitudinally a greater or less length of the chamber 2 and a certain amount will drop into the chamber 2ª. When the pitch is foamed and drops into the chamber from the pitch introducing apparatus it will enter the chamber 2ª at its receiving end and will be mixed with the finely divided material in that chamber. If the pitch is foamed and then blown from the introducing apparatus part of it will enter the chamber 2 and part of it will enter the chamber 2ª, as depends upon conditions, and particularly upon the pressure of the steam in the introducing apparatus, and also upon the condition of the material, dryness and temperature, and the speed of rotation of the mixing blades. The material passes from the chamber 2ª into the chamber 3, which is shown as provided with flues 18ᵇ and from the chamber 3 to the chamber 3ª, which corresponds with the chamber 3 illustrated in Fig. 1. The furnace which communicates with the flues 18ᵇ may be used when necessary, although ordinarily the chambers 3 and 3ª will be used for cooling purposes only.

Between the stacks 10 and 20 are located additional stacks 10ᶜ, 10ᵈ, 10ᵉ, 10ᶠ, which communicate respectively with the chambers 1ª, 2, 2ª and 3. These stacks connect preferably as shown near the inlet or anterior portion of each chamber. Each is shown as provided with a damper and steam jet, similar to those already described in connection with the stacks 10 and 20. By means of these stacks and their controlling dampers and steam jets the hot gases of combustion from the flues 16, 18, 18ª or 18ᵇ can be directed upward, and discharged from any of the chambers.

The process will vary to some extent with the operation of the pitch introducing apparatus. When this apparatus is used with dry steam and there is no foaming operation, practically all of the mixing will occur in the chamber 2, although some mixing will occur in the chamber 2ª. When the introducing apparatus is used as a foamer with low pressure steam, or water, or both, practically all of the mixing will occur in the chamber 2ª, and the chamber 2 will have the same function as the chambers 1 and 1ª. In all cases the mixing continues in all of the chambers following that into which the binder is introduced, but it becomes less and less as the material reaches the discharging end of the chamber 3ª.

It is possible, by controlling the dampers in the pipe 20 and stack 10, and in controlling the outlets of the flues 16, 18, 18ª and 18ᵇ, to accommodate the apparatus to material in different conditions of temperature, dryness and fineness. This is particularly desirable in briqueting coal dust which will vary in these attributes within wide limits and during short periods of time. The apparatus can be regulated as will be apparent without stopping its operation and without hindering the progress of the material through the apparatus. Also by regulating the dampers and the steam jets in the stacks 10ᶜ, 10ᵈ, 10ᵉ, and 10ᶠ, the hot gases can be caused to pass through the chambers in any direction and to any extent. For example, should it be found that the chamber 1 is too hot, the damper 10ª may be closed, and the damper in the stack 10ᶜ opened. The hot gases from the flue 16 will then pass out through the stack 10ᶜ and will not enter the chamber 1. Should it be desired to cause the hot gases to traverse the apparatus in the opposite direction, then all of the dampers, except that in the pipe 10ᶠ could be closed, and the hot gases would then traverse the chambers 1ª, 2, 2ª, and pass out through the stack 10ᶠ. If the dampers or steam jets in the other stacks are suitably controlled the path of the hot gases would accommodate itself accordingly. If desired the cold air shaft can be made through the stack 10ᶠ by opening the damper in that stack and by closing the damper 21ª in the stack 20, and then by means of the steam jet, or damper in the stack 10ᶠ cold air can be drawn in through the elevator pit 19 and discharged upward through the stack 10ᶠ.

Under some conditions fairly good results can be obtained without the use of any cooling chamber and by delivering the mixed material directly from the mixer to the molding or briqueting presses. It has been found essential that the material should be thoroughly heated before the pitch is added to it, and it is desirable to have the material dry, as we have found that dry material requires less heat than damp material to secure the proper adherence of the pitch with the particles. When the material is very wet, additional furnaces may be added to the drying chamber, or chambers, preceding the mixing chamber, or the number of drying chambers may be increased, so that the material may be properly dried and heated.

In accordance with the provisions of the patent statutes, we have described the principle of our invention together with the device which we now consider to represent the best embodiment thereof; but we desire to have it understood that the device shown is merely illustrative and that the invention can be carried out in other ways.

Having now described our invention what we claim as new and desire to secure by Letters Patent is as follows:

1. The process of preparing pulverulent materials for molding or briqueting, consisting in first subjecting the purverulent material to heating and drying gases while the material is maintained with its particles in a separated condition, then mixing the binder with such dried and heated material and finally subjecting the material to a cooling medium to reduce the binder to the plastic condition, substantially as set forth.

2. The process of preparing pulverulent materials for molding or briqueting, consisting in first subjecting the material to heating and drying gases while the material is maintained with its particles in a separated condition, then mixing the binder with the dried and heated material and then tossing or showering the combined material in a chamber through which air is drawn to reduce the temperature of the binder to the point of plasticity, substantially as set forth.

3. The process of preparing pulverulent materials for molding or briqueting, consisting in first subjecting the material to heating and drying gases while its particles are maintained in a separated condition, and subsequently mixing the binder with the dried and heated material, substantially as set forth.

4. The process of preparing pulverulent materials for molding or briqueting, consisting in first subjecting the material to heating and drying gases while the material is maintained with its particles in a separated condition, and then mixing the binder with the dried and heated material by the action of stirring blades upon such material and binder, substantially as set forth.

5. The process of preparing pulverulent materials for molding or briqueting, consisting in first subjecting the material to heating and drying gases while the material is maintained with its particles in a separated condition, then mixing the binder with the dried and heated material by stirring the binder therein, and then cooling the material to the point where the binder is plastic by tossing it in a chamber through which air is drawn, substantially as set forth.

This specification signed and witnessed this 7th day of August, 1908.

ELLSWORTH B. A. ZWOYER.
ROLLAND A. ZWOYER.

Witnesses:
  VIRGIL H. HEWES,
  FRANK NEET.